(12) United States Patent
Zhu et al.

(10) Patent No.: US 10,939,264 B2
(45) Date of Patent: Mar. 2, 2021

(54) CLOUD COMPUTING FOR MOBILE CLIENT DEVICES

(71) Applicant: Intel Corporation, Santa Clara, CA (US)

(72) Inventors: Bin Zhu, Beijing (CN); Yi Yang, Beijing (CN); He Lin, Beijing (CN); Yuming Li, Beijing (CN); Zuo Wang, Beijing (CN); Zhouyi Xie, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/554,693

(22) PCT Filed: Apr. 7, 2015

(86) PCT No.: PCT/CN2015/075985
§ 371 (c)(1),
(2) Date: Aug. 30, 2017

(87) PCT Pub. No.: WO2016/161552
PCT Pub. Date: Oct. 13, 2016

(65) Prior Publication Data
US 2018/0041557 A1    Feb. 8, 2018

(51) Int. Cl.
*H04N 21/232*    (2011.01)
*H04N 21/2343*   (2011.01)
(Continued)

(52) U.S. Cl.
CPC ............. *H04W 4/50* (2018.02); *G06F 9/54* (2013.01); *H04L 65/4084* (2013.01);
(Continued)

(58) Field of Classification Search
CPC .......... H04N 21/2225; H04N 21/2187; H04N 21/23611; H04N 21/4788; H04N 21/4622;
(Continued)

(56) References Cited

U.S. PATENT DOCUMENTS

| 2012/0023484 A1* | 1/2012 | Demant | G06F 8/38 |
| | | | 717/125 |
| 2012/0221955 A1* | 8/2012 | Raleigh | H04M 15/00 |
| | | | 715/736 |

(Continued)

FOREIGN PATENT DOCUMENTS

| CN | 1928871 A | 3/2007 |
| CN | 102571940 A | 7/2012 |

(Continued)

OTHER PUBLICATIONS

Extended European Search Report dated Oct. 2, 2018 for European Patent Application No. 15888109.4, 8 pages.
(Continued)

*Primary Examiner* — Brian T Pendleton
*Assistant Examiner* — Jean D Saint Cyr
(74) *Attorney, Agent, or Firm* — Schwabe, Williamson & Wyatt, P.C.

(57) ABSTRACT

Apparatuses, methods and storage medium associated with cloud computing for mobile client devices are disclosed herein. In embodiments, a cloud server may include one or more processors, and a mobile computing operating system to host execution of an application. The cloud server may also include a cloud application server to interact with a cloud application client of a mobile client device to provide audio and video streams to the mobile client device, and to receive touch, key and sensor events from the mobile client device, to enable the application to be executed for the (Continued)

mobile client device. Other embodiments may be described or claimed.

12 Claims, 8 Drawing Sheets

(51) Int. Cl.
| | | |
|---|---|---|
| *H04N 21/235* | (2011.01) | |
| *H04N 21/258* | (2011.01) | |
| *H04N 21/422* | (2011.01) | |
| *H04N 21/435* | (2011.01) | |
| *H04N 21/4402* | (2011.01) | |
| *H04N 21/442* | (2011.01) | |
| *H04N 21/472* | (2011.01) | |
| *H04N 21/63* | (2011.01) | |
| *H04W 4/50* | (2018.01) | |
| *G06F 9/54* | (2006.01) | |
| *H04L 29/06* | (2006.01) | |
| *H04L 29/08* | (2006.01) | |
| *H04N 21/414* | (2011.01) | |
| *H04W 4/06* | (2009.01) | |

(52) U.S. Cl.
CPC ........ *H04L 65/4092* (2013.01); *H04L 65/602* (2013.01); *H04L 67/1097* (2013.01); *H04L 67/125* (2013.01); *H04L 67/42* (2013.01); *H04N 21/41407* (2013.01); *H04W 4/06* (2013.01); *G06F 2209/541* (2013.01)

(58) Field of Classification Search
CPC ......... H04N 21/2668; H04N 21/47205; H04N 21/235

USPC ..... 725/87, 19, 115, 34, 37, 28, 80, 109, 93, 725/14

See application file for complete search history.

(56) References Cited

U.S. PATENT DOCUMENTS

| | | | |
|---|---|---|---|
| 2013/0054734 | A1 | 2/2013 | Bond et al. |
| 2014/0137043 | A1* | 5/2014 | Matas ................ G06F 16/904 |
| | | | 715/835 |
| 2014/0267339 | A1* | 9/2014 | Dowd ................... H04M 1/00 |
| | | | 345/581 |
| 2014/0280704 | A1 | 9/2014 | Ongg et al. |
| 2015/0011311 | A1* | 1/2015 | Relan ..................... A63F 13/30 |
| | | | 463/31 |

FOREIGN PATENT DOCUMENTS

| | | |
|---|---|---|
| CN | 102647620 A | 8/2012 |
| CN | 102981440 A | 3/2013 |
| CN | 103259874 A | 8/2013 |
| WO | WO 2013/095485 A1 | 6/2013 |
| WO | WO 2014/029944 A1 | 2/2014 |

OTHER PUBLICATIONS

International Search Report and Written Opinion dated Dec. 29, 2015 for International Application PCT/CN2015/075985; 11 pages.
Office Action dated Aug. 31, 2020 for European Patent Application No. 15888109.4, 6 pages.
Office Action dated Oct. 14, 2019 for European Patent Application No. 15888109.4, 7 pages.

* cited by examiner

CLOUD COMPUTING FOR MOBILE CLIENT DEVICES

CROSS REFERENCE TO RELATED APPLICATIONS

The present application is a national phase entry under 35 U.S.C. § 371 of International Application No. PCT/CN2015/075985, filed Apr. 7, 2015, entitled "CLOUD COMPUTING FOR MOBILE CLIENT DEVICES", which designated, among the various States, the United States of America. The Specification of the PCT/CN2015/075985 Application is hereby fully incorporated by reference.

TECHNICAL FIELD

The present disclosure relates to the field of computing. More particularly, the present disclosure relates to cloud computing for mobile client devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrate circuit, computing, networking and related technologies, mobile computing devices have become widely available. At the same time, a plethora of applications are available for the mobile computing devices. Typically, an application developer develops an application, submits the application to the operator of an Application Store, and gets the application accepted and become available for download from the Application Store. Users of mobile computing devices would then go to the Application Store, download and install the application on the mobile computing devices, before the application can be run on the mobile computing devices. Periodically, the users have to access the Application Store again to download and install the updates to keep the applications current. The process is relatively cumbersome for the less sophisticated users. Additionally, executing applications on the mobile computing devices has the disadvantage of consuming battery power of the mobile computing devices, and reduces the duration of operation in between charges. Further, it requires the mobile computing devices to have increasing capabilities, and in turn, cost.

BRIEF DESCRIPTION OF THE DRAWINGS

Embodiments of cloud computing for mobile computing devices of the present disclosure will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
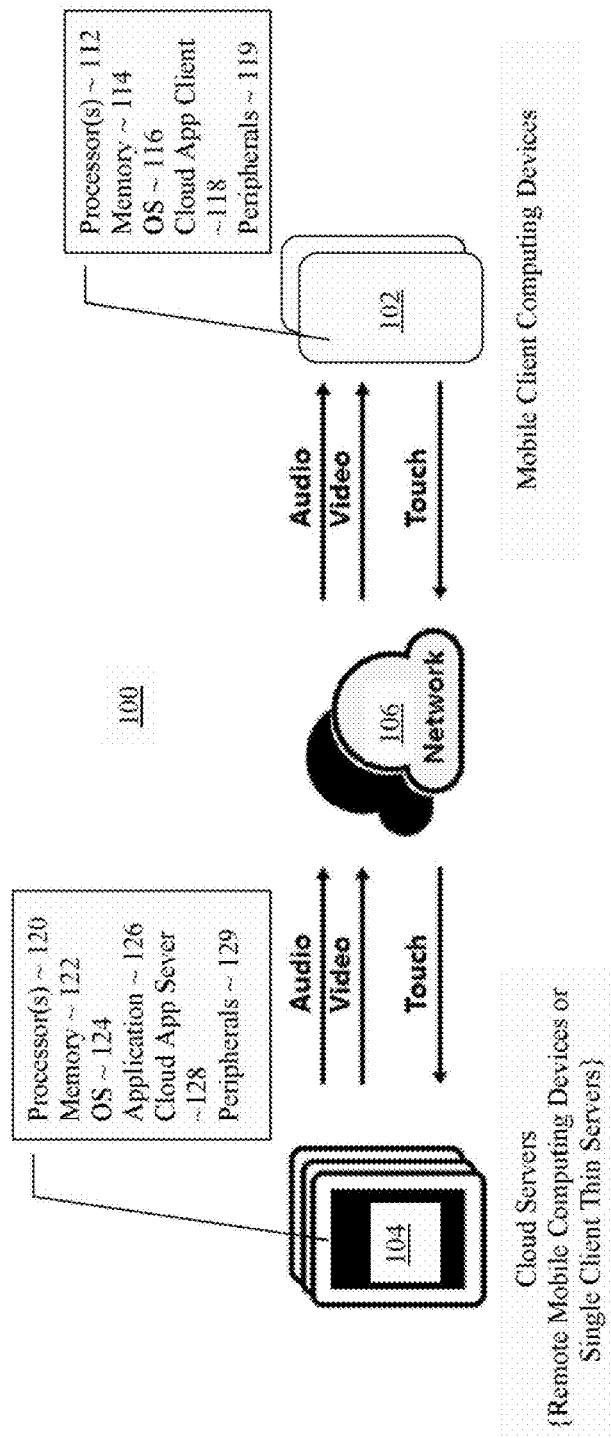
FIG. 1 illustrates a block diagram of a cloud computing environment incorporated with the cloud computing for mobile client device technique of the present disclosure, according to various embodiments.

Apparatuses, methods and storage medium associated with cloud computing for mobile client devices are disclosed herein. In embodiments, a cloud server may include one or more processors, and a mobile computing operating system to host execution of an application. The cloud server may also include a cloud application server to interact with a cloud application client of a mobile client device to provide audio and video streams to the mobile client device, and to receive touch, key and/or sensor events from the mobile client device, to enable the application to be executed by the cloud server for the mobile client device.

In embodiments, a mobile client device may include one or more processors, and a mobile computing operating system. The mobile client device may further include a cloud application client to interact with a cloud application server of a cloud server to receive audio and video streams from the cloud server, and to send touch, key and/or sensor events to the cloud server, to enable an application to be executed on the cloud server for the mobile client device.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a block diagram of a cloud computing environment incorporated with the cloud computing for mobile client device technique of the present disclosure, according to various embodiments, is shown. As illustrated, cloud computing environment 100 may include a number of mobile client computing devices 102 communicatively coupled to a number of cloud servers 104, via one or more networks 106. Mobile client computing devices 102 and cloud servers 104 may respectively include cloud application clients 118 and cloud application servers 128 of the present disclosure, to cooperate with each other to enable applications 126 to be executed on cloud servers 104 on behalf of mobile client computing devices 102. Resultantly, users of mobile client computing devices 102 may execute applications without having to download and install these applications on mobile client computing devices 102, before they can run the applications (nor having to periodically download and install the updates). Additionally, the battery power of mobile client computing devices 102 may provide for longer operation durations between charges. Further, it is not necessary to pack mobile client computing devices 102 with high capacity/performance components to execute the increasingly more complex/sophisticated applications, which in turn may reduce the cost and affordability of mobile client computing devices 102. These and other aspects will be described more fully below.

Each mobile client computing device 102, in addition to cloud application client 118, may include one or more processors 112, memory 114, mobile computing operating system 116, and peripherals 119, coupled with one another. Peripherals 119 may include, but are not limited to, touch sensitive screen, networking interface (NIC), and various sensors, such as, accelerometers, gyroscopes, global positioning, and so forth. Each of these elements, i.e. processors, 112, memory 114, mobile computing operating system 116 and peripherals 119 may be any one of a wide range of these elements known in the art. In other words, except for cloud application client 118, mobile client computing devices 102 may be any one of a number of mobile client computing devices known in the art, including, but are not limited to, wearable devices (such as, watches), smartphones, computing tablets, ultrabooks, e-books, laptop computers, and so forth.

Similarly, each cloud server 104, in addition to cloud application server 128, may include one or more processors 120, memory 122, mobile computing operating system 124, one or more applications 126, and peripherals 129, coupled with one another. Peripherals 129 may include, but are not limited to, touch sensitive screen, networking interface (NIC), and various sensors, such as, accelerometers, global positioning, and so forth. Each of these elements, i.e. processors, 120, memory 122, mobile computing operating system 124, applications 126, and peripherals 129 may be any one of a wide range of these elements known in the art. In other words, except for cloud application server 126, cloud servers 104 may be any one of a number of cloud servers known in the art.

In embodiments, cloud servers 104, themselves may be mobile computing devices, such as, but not limited to, wearable devices, smartphones, computing tablets, ultrabooks, e-books, laptop computers, and so forth. In alternate embodiments, cloud servers 104 may be thin servers designed to serve one mobile client computing device executing one application (for the mobile client computing device) at any one point in time (to be described more fully later with references to FIG. 6). In other words, in embodiments, cloud computing environment 100 may be formed without employing conventional high power servers designed to host multiple applications for numerous clients. Such conventional high power servers typically require sophisticated server software, such as virtual machine managers (VMM) or hypervisors, and may be difficult to administer and/or costly.

Figure 2:
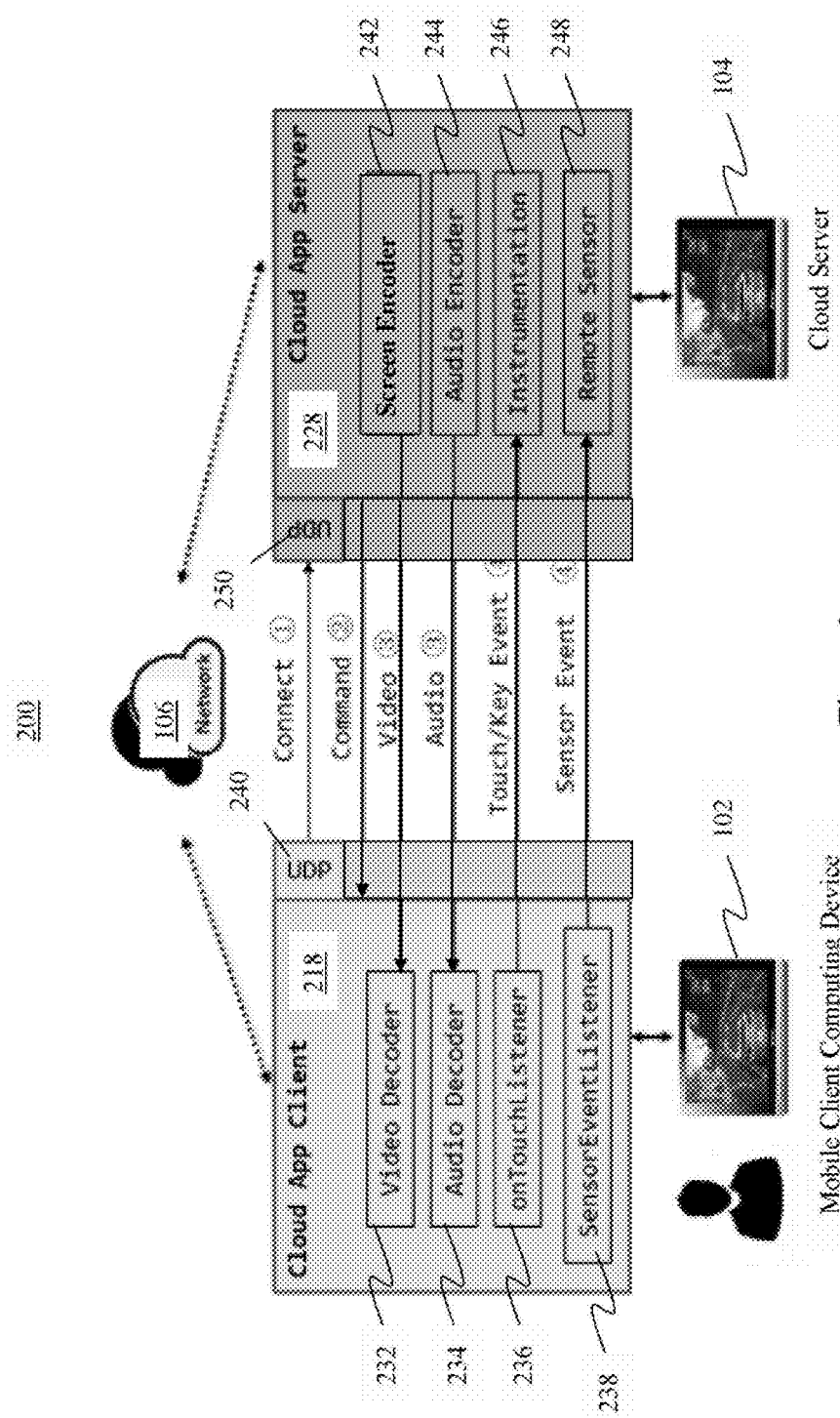
FIG. 2 illustrates the cloud application server and cloud application client of FIG. 1 in further detail, according to various embodiments.

Referring now to FIG. 2, wherein the cloud application server and cloud application client of FIG. 1, according to various embodiments, are illustrated in further detail. As shown, cloud application client 218, which may be suitable for use as client application client 118 of FIG. 1, and cloud application server 228, which may be suitable for use as cloud application server 128 of FIG. 1, may be respectively incorporated with communication functionalities 240 and 250, in support of e.g., User Datagram Protocol (UDP), to communicatively couple with each other via, e.g., a UDP connection. In other embodiments, communication functionalities 240 and 250 may support other communication protocols.

Additionally, cloud application server 228 and cloud application client 218 may be respectively configured to enable cloud application server 228 to provide commands, such as configuration commands, to cloud application client 218 to configure mobile client computing device 202, to enable cloud server 204 to execute an application on behalf of mobile client computing device 202. An example command may include, but is not limited to, screen resolution setting for mobile client computing device 202. Additional examples may include cloud application server 228 sending QoS control commands to cloud application client 218, e.g., to warn mobile client computing device 102 that current network is unstable and cloud server 104 has a need to decrease video resolution. Further examples may include cloud application client 218 sending video decoding failure to cloud application server 228, and cloud application server 228 would resend next instantaneous decoder refresh (IDR) frame and send command to ask cloud application client 218 to correct video decoding.

In embodiments, cloud application server 228 may further include screen encoder 242, audio encoder 244, instrumentation module 246 and one or more remote sensors 248, whereas, cloud application client 218 may further include video decoder 232, audio decoder 234, on touch listener 236 and one or more sensor event listeners 238, to correspondingly cooperate with each other to facilitate execution of the application by cloud server 204 for mobile client computing device 202.

More specifically, screen encoder 242, audio encoder 244, video decoder 232 and audio decoder 234 may be configured to enable screen encoder 242 and audio encoder 244 to respectively interact with video decoder 232 and audio decoder 234, to allow video and audio streams that capture the output of the application to be provided to mobile client computing device 202. On touch listener 236, sensor event listeners 238, instrumentation module 246 and remote sensors 248 may be configured to enable on touch listener 236 and sensor event listeners 238 to respectively interact with instrumentation module 246 and remote sensors 248 to provide touch, key and/or sensor events from mobile client device 202 to cloud server 204 as inputs to the application executing on cloud server 204.

Figure 3:
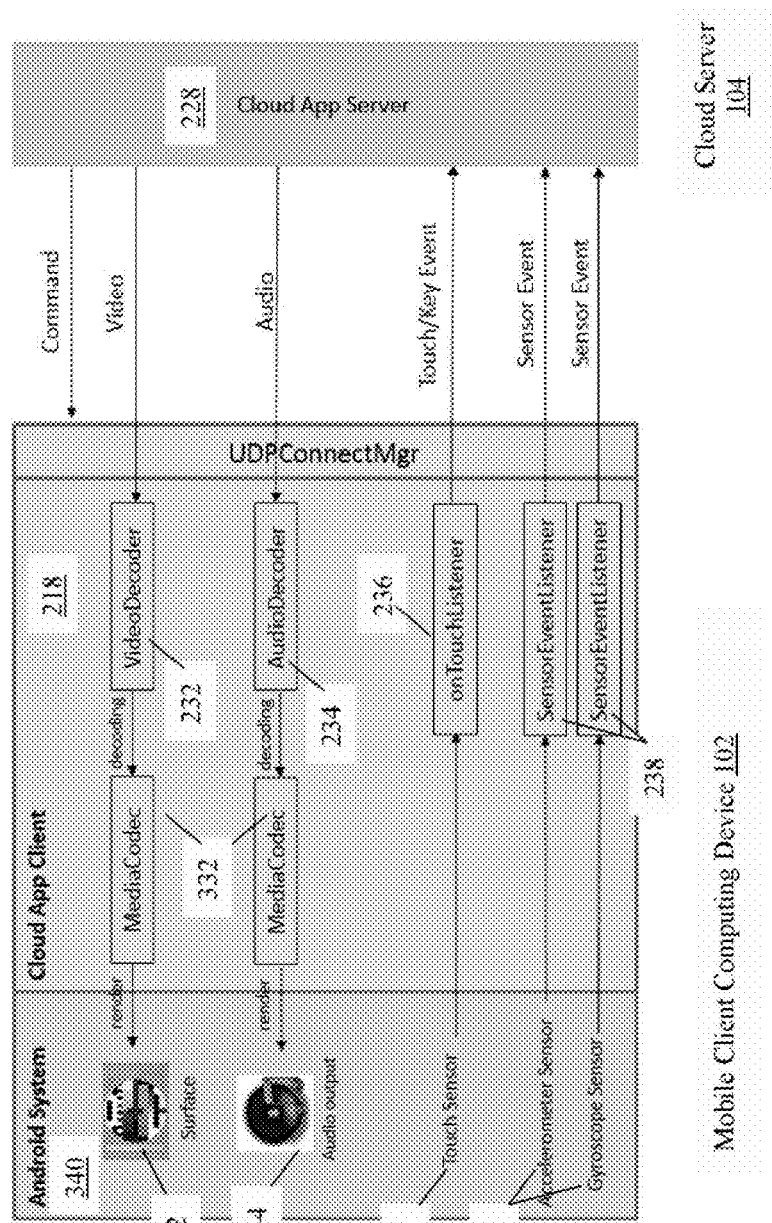
FIG. 3 illustrates the computing environment of the mobile client device, including the cloud application client, in further detail, according to various embodiments.
Figure 4:
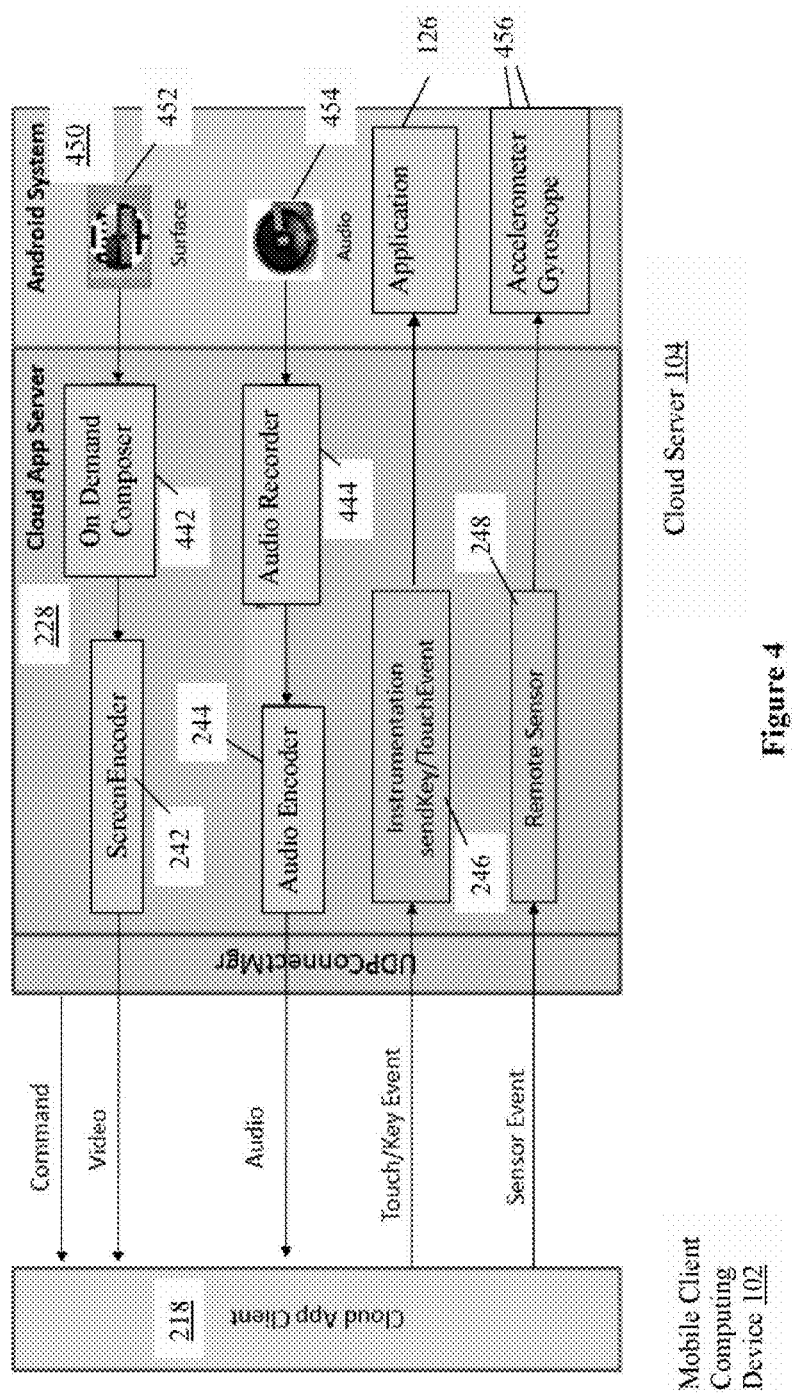
FIG. 4 illustrates the computing environment of a cloud server, including the cloud application server, in further detail, according to various embodiments.

Referring now FIGS. 3 and 4, wherein the computing environments of the mobile client computing device (including the cloud application client) and cloud server (including cloud application server) of FIGS. 1 and 2, are illustrated in further detail, according to various embodiments. The same reference numbers are used for common elements in FIGS. 1-4. As shown, for the example embodiments, mobile client computing device 102 and cloud server 104 may both operate e.g., an Android system 340 and 450. Android systems 340 and 450 may respectively include display surfaces 342 and 452, audio outputs 344 and 454, sensors (such as accelerometers and gyroscopes) 346 and 456. Android system 340 may also include touch sensor 348.

For cloud server 104, cloud application server 228, in addition to screen encoder 242, audio encoder 244, instrumentation module 246 and remote sensor 248, may further include on demand composer 442 and audio recorder 444, coupled with each other as shown. For mobile client computing device 102, cloud application client 218, in addition to video decoder 232, audio decoder 234, on touch listener 236 and sensor event listener 238, may include a number of media codecs 332, coupled with each other as shown.

Figure 5:
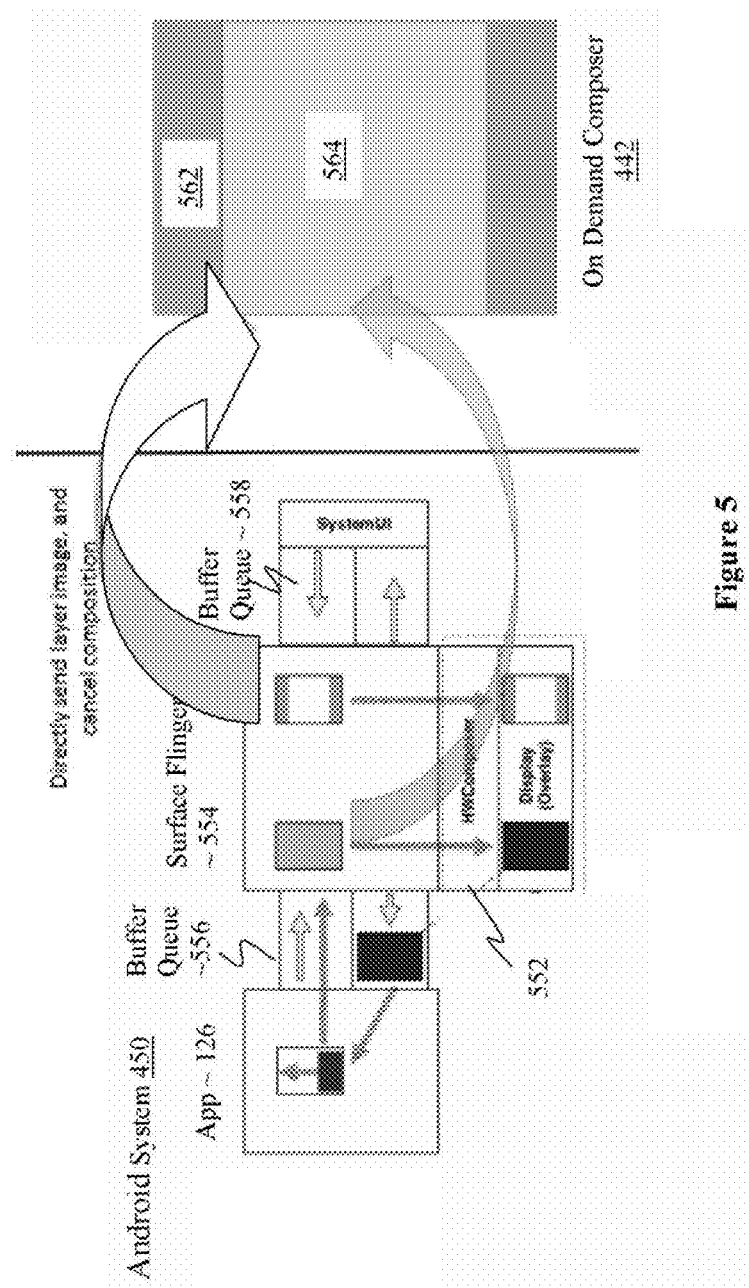
FIG. 5 illustrates the example cloud server and on demand composer of FIG. 4 in further detail, according to various embodiment.

In embodiments, on demand composer 442 may be configured to accelerate composition of the display surface of cloud server 104 while executing application 126. In particular, on demand composer 442 may be configured to compose the display surface of cloud server 104 with a reduced number of layer images. Referring now also to FIG. 5 where Android system 450 of cloud server 104 of FIG. 4, is illustrated in further detail, according to various embodiments. As shown, Android system 450, in addition to application 126 being executed for mobile client computing device 102, may include a number of buffer queues 556 and 558, SurfaceFlinger 554, and hardware composer (e.g., a graphics co-processor) 552, coupled with each other. During conventional operation, SurfaceFlinger 554 would cooperate with hardware composer 552 to combine the various layer images and display overlays to compose display surface 452. To reduce the latency perceived by mobile client computing device 102, in embodiments, on demand composer 442 may be configured to copy the substantive layer images 562 and 564 from SurfaceFlinger 554, compose a substitute display surface which will be displayed on client with the copied layer images 562 and 564, and cancel the composition normally performed by hardware composer 552.

Continuing to refer to FIGS. 3 and 4, screen encoder 242 may be configured to continuously encode the display surface composed by on demand composer 442 into video frames to form a video stream, and transmit the video stream to its counterpart (video decoder 232). The display surface may be encoded into a video stream employing any one of a number of video encoding schemes. Audio recorder 444 may be configured to record audio output of cloud server 104, while executing application 126 for mobile client computing device 102. Audio encoder 244 may be configured to encode the audio recording into an audio stream, and transmit the audio stream to its counterpart (audio decoder 234). The audio outputs may be encoded into an audio stream employing any one of a number of audio encoding schemes.

Video decoder 232 and audio decoder 234 may be respectively configured to decode the video and audio streams to recover the displays and audio outputs of application 126, and provide them to media codecs 332. Media codecs 332 may be configured to render the recovered displays and audio outputs as display surface 342 and audio output 344.

On the input side, on touch listener 236 may be configured to listen for touch or key events sensed by touch sensor 348. On detection of touch or key events, on touch listener 236 may forward the touch or key events to its counterpart (instrumentation module 246). On receipt, instrumentation module 246 may forward the touch or key events to application 126 as inputs.

Similarly, sensor event listeners 238 may be configured to listen for sensor events sensed by various sensors 346 (e.g., accelerometer or gyroscope). On detection of sensor events, sensor event listeners 238 may forward the sensor events to its counterpart (remote sensor 248). On receipt, sensor listeners 248 may forward the respective sensors 456, to cause them to output corresponding events for application 126 as inputs.

Figure 6:
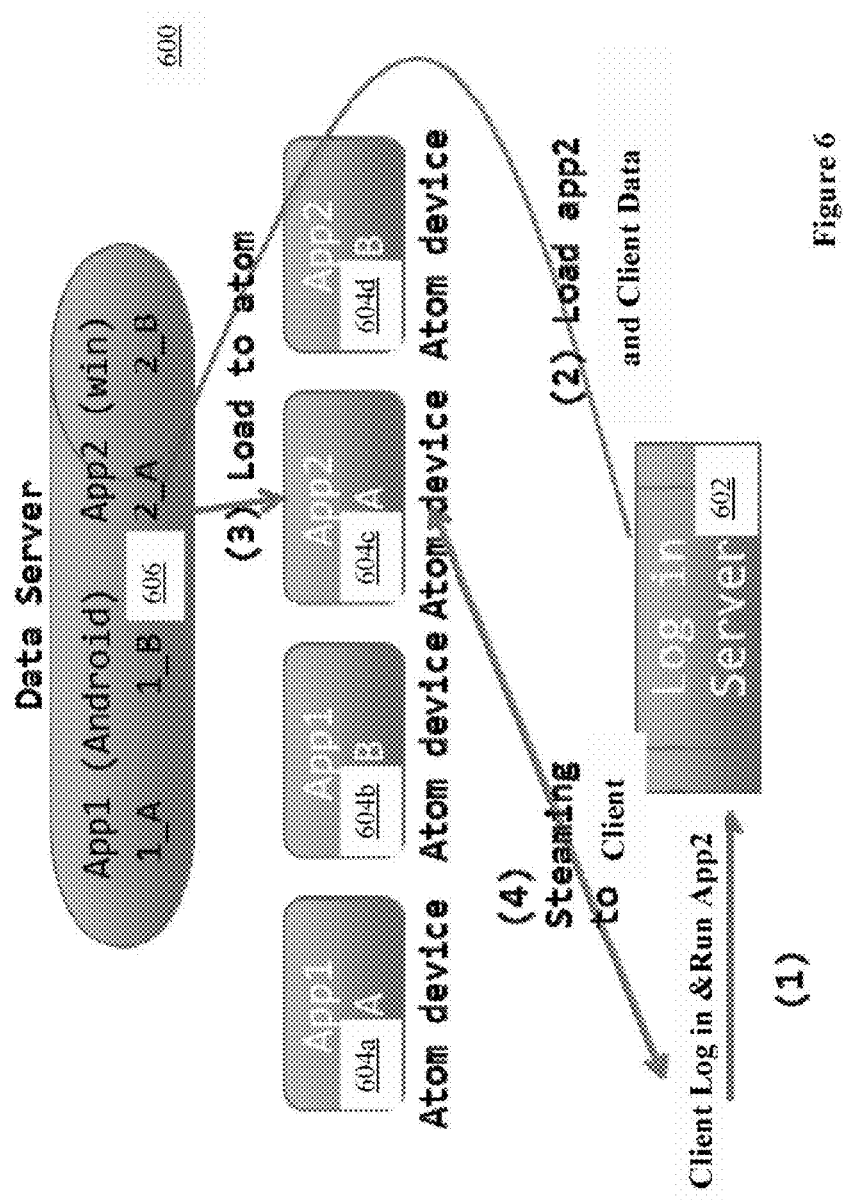
FIG. 6 illustrates an example cluster of computing servers, suitable for practicing the present disclosure, according to various embodiments.

Referring now to FIG. 6, wherein an example cluster of cloud servers, suitable for practicing the present disclosure, according to various embodiments, is illustrated. As shown, computing cluster 600 may include one or more log in servers 602, a number of "thin" cloud servers 604a-604d, and one or more data servers 606. Log in server(s) 602 may be configured to facilitate a mobile client computing device 102 in logging into the cluster 600, and run an application. Data server(s) 606 may be configured to host a number of applications, e.g., Android applications (denoted as 1_A and 1_B) or Window applications (denoted as 2_A and 2_B), persistent data of mobile client computing devices (across multiple execution sessions). Log in server(s) 602 and data server(s) 606 may be any one of a number of servers known in the art.

Each "thin" cloud server 604a-604d may be configured to host execution of one application for one mobile client computing device at any one point in time. In embodiments, each "thin" cloud server 604a-604d may be an Atom device configured with an Atom processor from Intel Corporation of Santa Clara, Calif., which is an ultra-low-voltage IA-32 and x86-64 CPUs (or microprocessors), an Android system 540, and cloud application server 228.

Accordingly, computing cluster 600 may provide cloud computing of applications for mobile client computing devices 102, without the complexity and cost of employing conventional high power servers that typically require sophisticated server software, such as virtual machine managers (VMM) or hypervisors.

Figure 7:
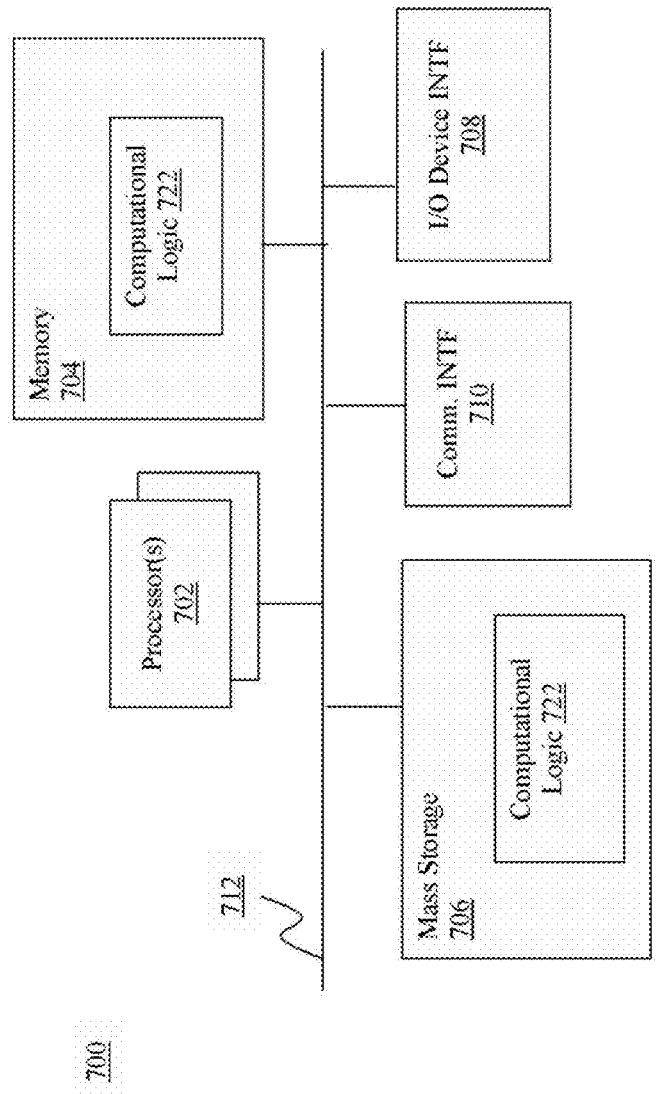
FIG. 7 illustrates an example computer system suitable for use to practice various aspects of the present disclosure, according to various embodiments.
Figure 8:
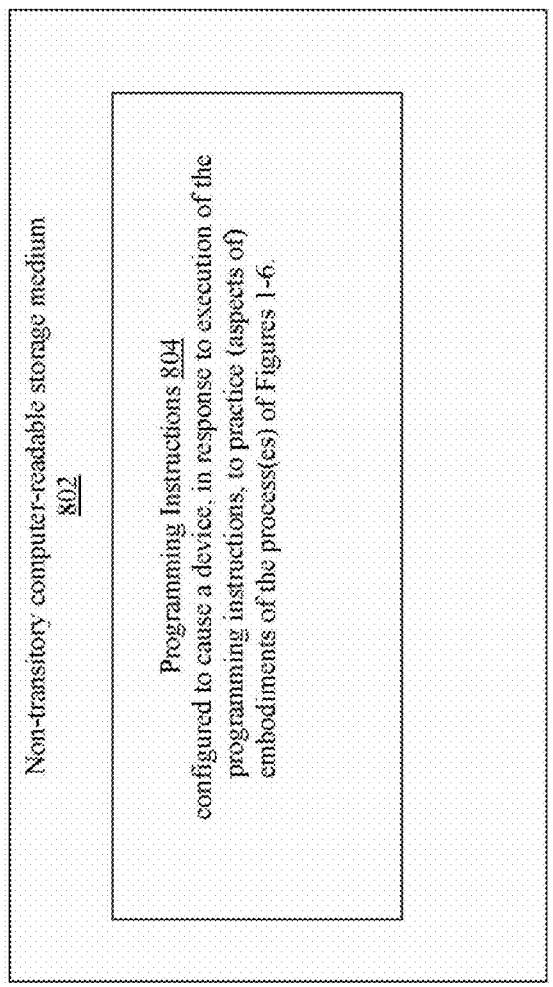
FIG. 8 illustrates a storage medium having instructions for practicing methods described with references to FIGS. 1-6, according to various embodiments.

FIG. 7 illustrates an example computer system that may be suitable for use to practice selected aspects of the present disclosure. As shown, computer 700 may include one or more processors or processor cores 702, and system memory 704. When employed as a "thin" cloud server 604a-604d of computing cluster 600, processor 702 may be a processor from the Atom processor family of Intel® Corporation. For the purpose of this application, including the claims, the term "processor" refers to a physical processor, and the terms "processor" and "processor cores" may be considered synonymous, unless the context clearly requires otherwise.

Additionally, computer 700 may include mass storage devices 706 (such as diskette, hard drive, compact disc read only memory (CD-ROM) and so forth), input/output devices 708 (such as display, keyboard, cursor control and so forth) and communication interfaces 710 (such as network interface cards, modems and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with cloud application server 228 or cloud application client 218, earlier described, collectively referred to as computational logic 722. The various elements may be implemented by assembler instructions supported by processor(s) 702 or high-level languages, such as, for example, C, that can be compiled into such instructions.

The number, capability and/or capacity of these elements 710-712 may vary, depending on whether computer 700 is used as a mobile client computing device, a log in server, a data server or a "thin" cloud server.

When use as mobile client computing device, the capability and/or capacity of these elements 710-712 may vary, depending on whether the mobile client computing device is a wearable device, a smartphone, a computing tablet, an ultrabook or a laptop computer. Otherwise, the constitutions of elements 710-712 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a device, e.g., computer 700, in response to execution of the programming instructions, to perform operations associated with cloud application server 228 and/or cloud application client 218. In alternate embodiments, programming instructions 804 may be disposed on multiple computer-readable non-transitory storage media 802 instead. In alternate embodiments, programming instructions 804 may be disposed on computer-readable transitory storage media 802, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 7, for one embodiment, at least one of processors 702 may be packaged together with memory having computational logic 722 (in lieu of storing on memory 704 and storage 706). For one embodiment, at least one of processors 702 may be packaged together with memory having computational logic 722 to form a System in Package (SiP). For one embodiment, at least one of processors 702 may be integrated on the same die with memory having computational logic 722. For one embodiment, at least one of processors 702 may be packaged together with memory having computational logic 722 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for mobile cloud computing, comprising: one or more processors; and a mobile computing operating system to be operated by the one or more processors to host execution of an application. The apparatus may further include a cloud application server to be operated by the one or more processors to interact with a cloud application client of a mobile client device to provide audio and video streams to the mobile client device, and to receive touch, key and sensor events from the mobile client device, to enable the application to be executed for the mobile client device.

Example 2 may be example 1, wherein the cloud application server may include an on demand composer to continuously compose a display surface of the apparatus executing the application, wherein the on demand composer composes the display surface using a reduced number of layer images used by a composer of the operating system to compose the display surface.

Example 3 may be example 2, wherein the cloud application server may further include a screen encoder to continuously encode the display surface into a video stream, and transmit the video stream to a video decoder of the cloud application client of the mobile client device.

Example 4 may be example 1, wherein the cloud application server may include an audio recorder to continuously generate a recording of audio outputs of the apparatus executing the application, and an audio encoder coupled to the audio recorder to encode the recording into an audio stream, and transmit the audio stream to an audio decoder of the cloud application client of the mobile client device.

Example 5 may be example 1, wherein the cloud application server may include an instrumentation module to receive, on behalf of the application, touch or key events, from a touch or key event listener of the cloud application client of the mobile client device.

Example 6 may be example 1, wherein the cloud application server may include a remote sensor to receive, on behalf of the application, sensor events, from a sensor event listener of the cloud application client of the mobile client device.

Example 7 may be any one of examples 1-6, wherein the apparatus may execute one application for one mobile client device at a time.

Example 8 may be a method for mobile cloud computing, comprising: executing an application, by a cloud server, on behalf of a mobile client device; interacting, by a cloud application server operating on the cloud server, with a cloud application client of a mobile client device to provide audio and video streams to the mobile client device to provide results of the execution to the mobile client device; and receiving, by the cloud application server, from the cloud application client of the mobile client device, touch, key or sensor events of the mobile client device to receive inputs for the application.

Example 9 may be example 8, wherein interacting may comprise the cloud application server continuously composing a display surface of the cloud server executing the application, using a reduced number of layer images used by a composer of the operating system to compose the display surface.

Example 10 may be example 9, wherein interacting may further comprise the cloud application server continuously encoding the display surface into a video stream, and transmitting the video stream to a video decoder of the cloud application client of the mobile client device.

Example 11 may be example 8, wherein interacting may further comprise the cloud application server continuously generating a recording of audio outputs of the cloud server executing the application, encoding the recording into an audio stream, and transmitting the audio stream to an audio decoder of the cloud application client of the mobile client device.

Example 12 may be example 8, wherein receiving may comprise the cloud application server receiving, on behalf of the application, touch or key events, from the cloud application client of the mobile client device.

Example 13 may be example 8, wherein receiving may further comprise the cloud application server receiving, on behalf of the application, sensor events, from a sensor event listener of the cloud application client of the mobile client device.

Example 14 may be example 8, wherein executing may comprise the cloud server executing one application for one mobile client device at a time.

Example 15 may be one or more computer-readable media comprising instructions that cause a cloud server, in response to execution of the instructions by the cloud server, to: operate a cloud application server to interact with a cloud application client of a mobile client device to provide audio and video streams to the mobile client device, and to receive touch, key and sensor events from the mobile client device, to enable an application to be executed on the cloud server for the mobile client device.

Example 16 may be example 15, wherein to operate a cloud application server may include to operate an on demand composer to continuously compose a display surface of the apparatus executing the application, wherein the on demand composer composes the display surface using a reduced number of layer images used by a composer of the operating system to compose the display surface.

Example 17 may be example 16, wherein to operate a cloud application server may further include to operate a screen encoder to continuously encode the display surface into a video stream, and transmit the video stream to a video decoder of the cloud application client of the mobile client device.

Example 18 may be example 15, wherein to operate a cloud application server may further include to operate an audio recorder to continuously generate a recording of audio outputs of the apparatus executing the application, and an audio encoder coupled to the audio recorder to encode the recording into an audio stream, and transmit the audio stream to an audio decoder of the cloud application client of the mobile client device.

Example 19 may be example 15, wherein to operate a cloud application server may further include to operate an instrumentation module to receive, on behalf of the application, touch or key events, from a touch or key event listener of the cloud application client of the mobile client device.

Example 20 may be example 15, wherein to operate a cloud application server may further include to operate a remote sensor to receive, on behalf of the application, sensor events, from a sensor event listener of the cloud application client of the mobile client device.

Example 21 may be any one of examples 15-21, wherein to execute an application is to execute one application for one mobile client device at a time.

Example 22 may be a server for mobile cloud computing, comprising: means for executing an application on behalf of a mobile client device; means for interacting with a cloud application client of a mobile client device to provide audio and video streams to the mobile client device to provide results of the execution to the mobile client device; and means for receiving from the cloud application client of the mobile client device, touch, key or sensor events of the mobile client device to receive inputs for the application.

Example 23 may be example 22, wherein means for interacting may comprise means for the cloud application server continuously composing a display surface of the cloud server executing the application, using a reduced number of layer images used by a composer of the operating system to compose the display surface.

Example 24 may be example 23, wherein means for interacting may further comprise means for the cloud application server continuously encoding the display surface into a video stream, and means for transmitting the video stream to a video decoder of the cloud application client of the mobile client device.

Example 25 may be example 22, wherein means for interacting may further comprise means for the cloud application server continuously generating a recording of audio outputs of the cloud server executing the application, means for encoding the recording into an audio stream, and means for transmitting the audio stream to an audio decoder of the cloud application client of the mobile client device.

Example 26 may be example 22, wherein means for receiving may comprise means for the cloud application server receiving, on behalf of the application, touch or key events, from the cloud application client of the mobile client device.

Example 27 may be example 22, wherein means for receiving may further comprise means for the cloud application server receiving, on behalf of the application, sensor events, from a sensor event listener of the cloud application client of the mobile client device.

Example 28 may be any one of examples 22-27, wherein means for executing may comprise means for the apparatus executing one application for one mobile client device at a time.

Example 29 may be a mobile client device for mobile cloud computing, comprising: one or more processors; and a cloud application client to be operated by the one or more processors to interact with a cloud application server of a cloud server to receive audio and video streams from the cloud server, and to send touch, key and sensor events to the cloud server, to enable an application to be executed on the cloud server for the mobile client device.

Example 30 may be example 29, wherein the cloud application client may include a video decoder to continuously receive a video stream of an encoded recording of a display surface of the cloud server while executing the application, and decode the video stream to recover the display surface for display on the mobile client device.

Example 31 may be example 29, wherein the cloud application client may include an audio decoder to continuously receive an audio stream of an encoded recording of audio outputs of the server while executing the application, and decode the audio stream to recover the audio outputs for output on the mobile client device.

Example 32 may be example 29, wherein the cloud application client may include a listener to listen for touch or key events of the mobile client device, and send the touch or key events to an instrumentation module of the cloud application server for input to the application.

Example 33 may be any one of examples 29-32, wherein the cloud application client may include a sensor event listener to listen for sensor events of the mobile client device, and send the sensor events to a remote sensor of the cloud application server for input to the application.

Example 34 may be a method for mobile cloud computing, comprising: interacting, by a cloud application client operating on a mobile client device, with a cloud application server of a cloud server to receive audio and video streams from the cloud server to provide results of an execution of an application by the cloud sever for the mobile client device; and sending, by the cloud application client, to the cloud application server of the cloud server, touch, key or sensor events of the mobile client device to provide inputs for the application.

Example 35 may be example 34, wherein interacting may comprise the cloud application client continuously receiving a video stream of an encoded recording of a display surface of the cloud server while executing the application, and decoding the video stream to recover the display surface for display on the mobile client device.

Example 36 may be example 34, wherein interacting may comprise the cloud application client continuously receiving an audio stream of an encoded recording of audio outputs of the server while executing the application, and decoding the audio stream to recover the audio outputs for output on the mobile client device.

Example 37 may be example 34, wherein sending may comprise the cloud application client listening for touch or key events of the mobile client device, and sending the touch or key events to an instrumentation module of the cloud application server for input to the application.

Example 38 may be example 34-37, wherein sending may comprise the cloud application client listening for sensor events of the mobile client device, and sending the sensor events to a remote sensor of the cloud application server for input to the application.

Example 39 may be one or more computer-readable media comprising instructions that cause a mobile client device, in response to execution of the instructions by the mobile client device, to: operate a cloud application client to interact with a cloud application server of a cloud server to receive audio and video streams from the cloud server, and to send touch, key and sensor events to the cloud server, to enable an application to be executed on the cloud server for the mobile client device.

Example 40 may be example 39, wherein to operate a cloud application client may include to operate a video decoder to continuously receive a video stream of an encoded recording of a display surface of the cloud server while executing the application, and decode the video stream to recover the display surface for display on the mobile client device.

Example 41 may be example 39, wherein to operate a cloud application client may include to operate the cloud application client to continuously receive an audio stream of an encoded recording of audio outputs of the server while executing the application, and decode the audio stream to recover the audio outputs for output on the mobile client device.

Example 42 may be example 39, wherein to operate a cloud application client may include to operate the cloud application client to listen for touch or key events of the mobile client device, and send the touch or key events to an instrumentation module of the cloud application server for input to the application.

Example 43 may be any one of examples 39-42, wherein to operate a cloud application client may include to operate the cloud application client to listen for sensor events of the mobile client device, and send the sensor events to a remote sensor of the cloud application server for input to the application.

Example 44 may be a server for mobile cloud computing, comprising: means for interacting with a cloud application server of a cloud server to receive audio and video streams from the cloud server to provide results of an execution of an application by the cloud sever for the mobile client device; and means for sending to the cloud application server of the cloud server, touch, key or sensor events of the mobile client device to provide inputs for the application.

Example 45 may be example 44, wherein means for interacting may comprise means for the cloud application client continuously receiving a video stream of an encoded recording of a display surface of the cloud server while executing the application, and means for decoding the video stream to recover the display surface for display on the mobile client device.

Example 46 may be example 44, wherein means for interacting may comprise means for the cloud application client continuously receiving an audio stream of an encoded recording of audio outputs of the server while executing the application, and means for decoding the audio stream to recover the audio outputs for output on the mobile client device.

Example 47 may be example 44, wherein means for sending may comprise means for the cloud application client listening for touch or key events of the mobile client device, and means for sending the touch or key events to an instrumentation module of the cloud application server for input to the application.

Example 48 may be example 44-47, wherein means for sending may comprise means for the cloud application client listening for sensor events of the mobile client device, and means for sending the sensor events to a remote sensor of the cloud application server for input to the application.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. A server apparatus for mobile cloud computing, comprising:
    one or more processors;
    an operating system, including a composer, to be operated by the one or more processors to host execution of an application, the composer being arranged to compose a display surface of the application with using a number of layer images; and
    a cloud application server, separate from the application and the operating system, to be operated by the one or more processors to interact with a counterpart cloud application client of a mobile client device to provide audio and video streams, on behalf of a separate application, to the mobile client device, and to receive touch, key and sensor events from the mobile client device for the separate application, to enable the application to be executed on the server apparatus for the mobile client device;

wherein to provide video streams, on behalf of the separate application, to the mobile client device, the cloud application server includes an on demand composer, different from the composer of the operating system, to continuously compose a corresponding version of the display surface on the server apparatus for the separate application, wherein the on demand composer composes the corresponding version of the display surface using a reduced number of layer images otherwise used by the composer of the operating system to compose the display surface; and wherein the cloud application server further includes a screen encoder to continuously encode the corresponding version of the display surface with the reduced number of layer images into a video stream, and transmit the video stream to a video decoder of the cloud application client of the mobile client device.

2. The server apparatus of claim 1, wherein the cloud application server further includes an audio recorder to continuously generate a recording of audio outputs on the server apparatus for the separate application, and an audio encoder coupled to the audio recorder to encode the recording into an audio stream, and transmit the audio stream to an audio decoder of the cloud application client of the mobile client device.

3. The server apparatus of claim 1, wherein to receive touch, key and sensor events from the mobile client device for the separate application, the cloud application server includes an instrumentation module to receive, on behalf of the separate application, touch or key events, from a touch or key event listener of the cloud application client of the mobile client device; and a remote sensor to receive, on behalf of the separate application, sensor events, from a sensor event listener of the cloud application client of the mobile client device.

4. The server apparatus claim 1, wherein the server apparatus is to execute one application for each mobile client device at a time.

5. A method for mobile cloud computing, comprising:

executing an application, by a cloud server having an operating system, on behalf of a mobile client device, the operating system being arranged to compose a display surface of the application with using a number of layer images;

interacting, with a cloud application server operating on the cloud server, separate from the application, with a counterpart cloud application client of a mobile client device to provide audio and video streams, on behalf of a separate application, to the mobile client device to provide results of the execution of the application to the mobile client device; and receiving, by the cloud application server, from the cloud application client of the mobile client device, touch, key or sensor events of the mobile client device to receive inputs for the separate application;

wherein interacting comprises the cloud application server continuously composing a counterpart version of the display surface on the cloud server for the separate application, using an on demand composer, different from the composer of the operating system, that composes the counterpart version of the display surface using a reduced number of layer images, otherwise used by the composer of the operating system to compose the display surface; and wherein interacting further comprises the cloud application server continuously encoding the counterpart version of the display surface into a video stream with the reduced number of layer images, and transmitting the video stream to a video decoder of the cloud application client of the mobile client device.

6. The method of claim 5, wherein the cloud application server further continuously generates a recording of audio outputs on the cloud server for the separate application, encoding the recording into an audio stream, and transmitting the audio stream to an audio decoder of the cloud application client of the mobile client device.

7. The method of claim 5, wherein receiving comprises the cloud application server receiving, on behalf of the separate application, touch or key events, from the cloud application client of the mobile client device; and the cloud application server receiving, on behalf of the separate application, sensor events, from a sensor event listener of the cloud application client of the mobile client device.

8. The method of claim 5, wherein executing comprises the cloud server executing one application for each mobile client device at a time.

9. One or more non-transitory computer-readable media comprising instructions that cause a cloud server, in response to execution of the instructions by the cloud server, to:

operate a cloud application server to interact with a counterpart cloud application client of a mobile client device to provide audio and video streams, on behalf of a separate application executing on the cloud server, to the mobile client device, and to receive touch, key and sensor events from the mobile client device for the separate application, to enable the application to be executed on the cloud server for the mobile client device, the cloud server having an operating system that includes a composer arranged to compose a display surface of the application with using a number of layer images;

wherein to operate a cloud application server includes to operate an on demand composer, different from the composer of the operating system, to continuously compose a counterpart version of the display surface on the apparatus for the separate application, wherein the on demand composer composes the counterpart version of the display surface using a reduced number of layer images otherwise used by the composer of the operating system to compose the display surface; and wherein to operate a cloud application server further includes to operate a screen encoder to continuously encode the counterpart version of the display surface with the reduced number of layer images into a video stream, and transmit the video stream to a video decoder of the cloud application client of the mobile client device.

10. The one or more non-transitory computer-readable media of claim 9, wherein to operate a cloud application server further includes to operate an audio recorder to continuously generate a recording of audio outputs on the apparatus for the separate application, and an audio encoder coupled to the audio recorder to encode the recording into an audio stream, and transmit the audio stream to an audio decoder of the cloud application client of the mobile client device.

11. The one or more non-transitory computer-readable media of claim 9, wherein to operate a cloud application server further includes to operate an instrumentation module to receive, on behalf of the separate application, touch or key events, from a touch or key event listener of the cloud application client of the mobile client device; and to operate a cloud application server further includes to operate a remote sensor to receive, on behalf of the separate application, sensor events, from a sensor event listener of the cloud application client of the mobile client device.

12. The one or more non-transitory computer-readable media of claim 9, wherein to execute an application is to execute one application for each mobile client device at a time.

* * * * *